United States Patent
Blahaerath et al.

(10) Patent No.: US 9,250,893 B2
(45) Date of Patent: Feb. 2, 2016

(54) VIRTUALIZED AND AUTOMATED SOFTWARE BUILD SYSTEM

(71) Applicant: Western Digital Technologies, Inc., Irvine, CA (US)

(72) Inventors: Grant C. Blahaerath, Redmond, WA (US); Eduard Tevanyan, Yorba Linda, CA (US); David Cohen, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/532,275

(22) Filed: Nov. 4, 2014

(65) Prior Publication Data

US 2015/0331689 A1 Nov. 19, 2015

Related U.S. Application Data

(60) Provisional application No. 61/993,102, filed on May 14, 2014.

(51) Int. Cl.
*G06F 9/44* (2006.01)
*G06F 9/455* (2006.01)

(52) U.S. Cl.
CPC .. *G06F 8/71* (2013.01); *G06F 8/30* (2013.01); *G06F 9/45533* (2013.01)

(58) Field of Classification Search
USPC ................................. 717/106–109, 120–125
IPC ........................................ G06F 8/60,8/70, 8/71
See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 7,103,875 B1 * | 9/2006 | Kaneko | G06F 9/4448 717/106 |
| 7,120,692 B2 | 10/2006 | Hesselink et al. | |
| 7,146,608 B1 * | 12/2006 | Newman et al. | 717/168 |
| 7,290,244 B2 * | 10/2007 | Peck | G06F 11/263 717/109 |
| 7,340,719 B1 * | 3/2008 | Bakerman | G06F 8/70 717/106 |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,640,533 B1 * | 12/2009 | Lottero | G06F 8/71 717/108 |
| 7,673,285 B1 * | 3/2010 | Michel | G06F 8/45 717/107 |

(Continued)

OTHER PUBLICATIONS

Le et al, "Patch Verification via Multiversion Interprocedural Control Flow Graphs", ACM, pp. 1047-1058, 2014.*

(Continued)

*Primary Examiner* — Anil Khatri (57) ABSTRACT

A software automation build system including a one or more source code repositories, the one or more source code repositories including source code of a software product and a source code for a build system. The source code for the build system stores a configuration specifying a build and test environment as a configuration file that can be accessed remotely by users to replicate a consistent virtual build and test environment for developing and testing code of the software product at different locations, using virtual machines. The system may include one or more instances of the build system based on the configuration. The system may save versions of the configuration so that multiple versions of the build system can be accessed and built virtually.

25 Claims, 6 Drawing Sheets

(56) References Cited

U.S. PATENT DOCUMENTS

| | | | |
|---|---|---|---|
| 7,676,788 B1 * | 3/2010 | Ousterhout | G06F 8/71 709/226 |
| 7,730,448 B2 * | 6/2010 | Meijer | G06F 8/437 717/106 |
| 7,761,848 B1 * | 7/2010 | Chaffin | 717/116 |
| 7,788,404 B2 | 8/2010 | Hesselink et al. | |
| 7,870,535 B2 * | 1/2011 | Rippert et al. | 717/100 |
| 7,873,958 B2 * | 1/2011 | Wiltamuth et al. | 717/170 |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,001,523 B1 * | 8/2011 | Wiltamuth et al. | 717/114 |
| 8,004,791 B2 | 8/2011 | Szeremeta et al. | |
| 8,037,453 B1 | 10/2011 | Zawadzki | |
| 8,091,066 B2 * | 1/2012 | Fiore | G06F 8/71 717/106 |
| 8,201,148 B2 | 6/2012 | Solirov et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,381,176 B1 | 2/2013 | Bentley et al. | |
| 8,464,222 B2 | 6/2013 | Bell et al. | |
| 8,473,898 B2 * | 6/2013 | Pandey | 717/107 |
| 8,526,798 B2 | 9/2013 | Hesselink | |
| 8,533,676 B2 * | 9/2013 | Watters | G06F 8/71 717/106 |
| 8,578,329 B1 * | 11/2013 | Chiluvuri | G06F 8/36 717/106 |
| 8,612,931 B2 * | 12/2013 | Bhandar et al. | 717/106 |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,713,527 B2 * | 4/2014 | Frontiero | G06F 8/71 717/120 |
| 8,732,665 B2 * | 5/2014 | Vedula | G06F 9/5061 702/119 |
| 8,762,682 B1 | 6/2014 | Stevens | |
| 8,780,004 B1 | 7/2014 | Chin | |
| 8,793,374 B2 | 7/2014 | Hesselink et al. | |
| 8,799,859 B2 * | 8/2014 | Wehrwein | G06F 11/3664 717/120 |
| 8,819,443 B2 | 8/2014 | Lin | |
| 8,959,484 B2 * | 2/2015 | Pinnix | 717/124 |
| 2005/0144195 A1 | 6/2005 | Hesselink et al. | |
| 2005/0144200 A1 | 6/2005 | Hesselink et al. | |
| 2007/0168955 A1 | 7/2007 | Nicol et al. | |
| 2008/0066049 A1 | 3/2008 | Jain et al. | |
| 2008/0120598 A1 | 5/2008 | Imeshev | |
| 2012/0036041 A1 | 2/2012 | Hesselink | |
| 2012/0246616 A1 | 9/2012 | Frontiero et al. | |
| 2012/0246617 A1 | 9/2012 | Frontiero et al. | |
| 2013/0174124 A1 | 7/2013 | Watters et al. | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |

OTHER PUBLICATIONS

Liu et al, "A Formal Framework for Component Deployment", ACM, pp. 325-343, 2006.*

Nguyen et al, "An Infrastructure for Development of Object-Oriented, Multilevel Configuration Management Services", ACM, pp. 215-224, 2005.*

Gu et al, "SCOBA: Source Code Based Attestation on Custom Software" ACM, pp. 227-346, 2010.*

Palix et al, "Tracking Code Patterns over Multiple Software Versions with Herodotos", ACM, pp. 169-180, 2010.*

Oosterman et al, " EvoJava: A Tool for Measuring Evolving Software" ACM, pp. 117-126, 2011.*

* cited by examiner

VIRTUALIZED AND AUTOMATED SOFTWARE BUILD SYSTEM

This application claims the benefit of U.S. Provisional Application Ser. No. 61/993,102, entitled "SOFTWARE TEST AND BUILD SYSTEM" filed on May 14, 2014, which is expressly incorporated by reference herein in its entirety.

BACKGROUND

Developing software may involve a complex process that requires coordinated management. Multiple users may work at different locations on different projects. It has been necessary to rely on various processes, including manual management, to save and track systems.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of software build and test systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as software or hardware depends upon the particular application and design constraints imposed on the overall system.

In the past, it has been necessary to rely on various processes, including manual management, to save and track systems for developing source code for a software product. Not only was it necessary to track the build system itself, but it was necessary to track tools that were required by the build system at particular points in time.

Aspects of a Versioned Build and Test system (VBT) presented herein provide a way to create consistent build results when developing software, even when the builds are done using different instances of the system, which may be operating at different locations.

In some embodiments, the VBT system may allow an administrator to specify a configuration for a build and test environment using a configuration file. Thereafter, multiple users, whether working at the same location or different locations, can use the configuration file to build a consistent virtual build and test environment that includes virtual machines. Users can then use the instance of the VBT to build and test their software projects and to obtain consistent results. Changes and improvements to the build system, made by any of the multiple users, can be shared with all other instances of the build system in a coordinated and controlled way.

Additionally, each instance of the build system can be branched to meet the unique needs of the applications and operating systems being constructed by various users without impacting other applications that are built, e.g., by the same build system.

The VBT can provide a way, in some embodiments, to create and maintain a build and test environment in a way that saves and versions changes to the build system whenever changes need to be made. This allows, in some embodiments, the ability to accurately reproduce any of a number of previous versions at a future point in time, so that components that were built in the previous version can be accurately built again in exactly the same way. Each separate, running version of the VBT is an instance.

Different instances of the VBT may be designated as any of a production environment, a staging environment, and a development environment. The instance of the VBT may also be switched between the different types of environments.

Previously, it was necessary to rely on various processes and steps, some of them manual, to save and track build systems. Not only was it necessary to track the build system itself, but it would be necessary to track, e.g., an integration tool that provides control over one or more build systems, as well as any tools that the build system may have required or may have required at some point in time.

The VBT system can provide, in certain embodiments, a way to track all of the components of a build system over time.

Figure 1:
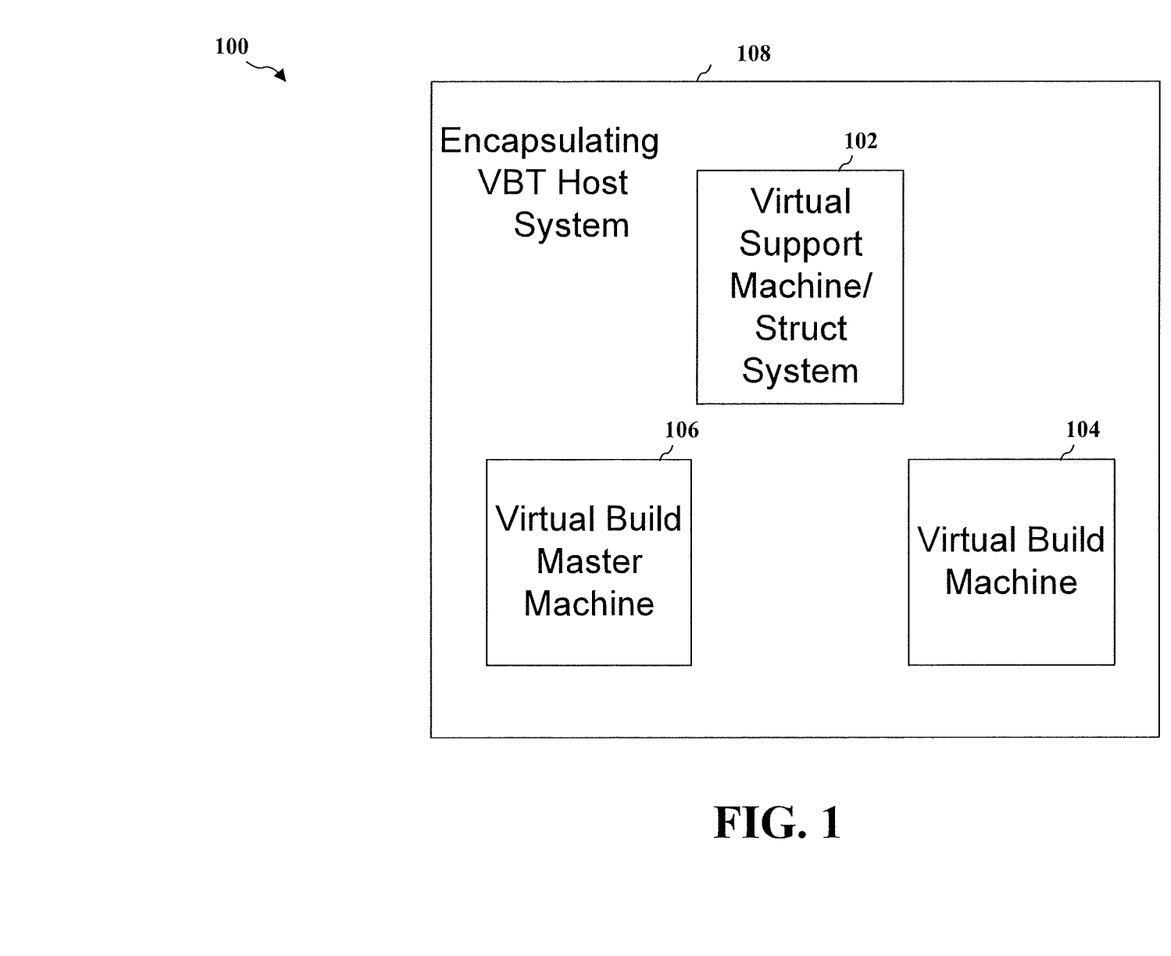
FIG. 1 is a diagram illustrating aspects of an example instance of a virtual build and test system.

FIG. 1 illustrates an example diagram of an instance of a VBT system 100. A VBT system may comprise a support machine 102, a build machine 104, a build master machine 106, and an encapsulating host 108, each of which may be a distinct virtual machine instance.

The virtual support machine 102, also referred to interchangeably as "struct system" or "struct," may be a virtual machine that provides support and utility functions to the other systems.

The build machine 104, also referred to interchangeably as "Builder," may be a virtual machine that runs build jobs. Thus, the virtual build machine performs tasks to build the code of the software product.

The build master machine 106 may be a virtual machine that submits and monitors build jobs that have been submitted to the virtual build machine 104. Thus, the virtual build master machine manages tasks within the software build project to build the code of the software product.

The VBT Host system 108 may be a virtual machine that encapsulates the other virtual machines and enables communication between the build machine 104 and the build master machine 106. Thus, the instance of the VBT 100 runs on the virtual host machine 108. The VBT forms a virtual computer with its own memory. The struct system 102 creates a localized network environment within the encapsulating host system 108 that allows the other virtual machines 104, 106 to communicate with each other and with other systems outside the VBT host system 108.

A VBT may be used in various scenarios. As one example, at the start of a new project, the latest VBT, e.g., using the latest VBT configuration file, may be used in order to instantiate a VBT. New build jobs may then be created in the VBT's build master machine 106.

Once working build jobs have been executed, those jobs can be checked into a central repository so that others can use them to build the new project. In some embodiments, the repository may be, e.g., a distributed revision control and source code management (SCM) system, such as a Git source repository. In another example, for work on an existing project, build jobs may have already been checked in. Once the latest VBT system is up and running, in some embodiments, those build jobs can be checked out in order to start building a project in a particular VBT system.

In the past, previous build servers required manual configurations to be entered and manually saving of changes. A single entity stored the information associated with the project. Access was required to this single point in order to receive and execute build jobs. This could be problematic with numerous users attempting to access the system, and required a substantial amount of manual management to ensure environment integrity.

In contrast, as presented herein, the configuration for a virtual environment is maintained so that the entire build and test environment may be built and/or rebuilt in an automated manner, e.g., at remote locations. The VBT involves storing the source code for the virtual machines involved in the building and testing of the code of a software product as source code. This allows the machine to be reconstructed as a virtual machine at any time. Each instance of the VBT replicates the corporate environment, including source code, build servers, and the virtual machines of the VBT.

The aspects of the VBT presented herein solve access problems that would have limited remote users of previous systems. In the past, remote users of previous systems required continuous access to the source code stored at a central environment. By instantiating a complete replica of the whole build and test environment, including VBT source code, virtual build servers, virtual build managers, virtual struct managers, etc., remote users can build independently from the primary/central environment by working within their own virtual replica of the build environment. When a VBT instance is initiated, it synchronizes with the source code stored at a central repository. The instance may receive synchronized information from a central source code server, e.g., for a project environment. The virtual replica instance may also check in finished projects to the central source code server, e.g., for a building environment.

One alternative build system could be implemented using a central master controller that would feed projects that were desired to be built to any of a number of destination build slaves, which would be set up to build a desired task. The central build manager could instruct the build slaves to build a job, receive the built job, and report built software. As a single master configuration is maintained, however, unintended aspects of a previous build job might be propagated to other build projects causing them to obtain false negatives or false positives.

One advantage of embodiments of the VBT over the alternative build system discussed above is that, once a build job has been executed, the instance may optionally be destroyed. Thus, embodiments of the VBT provide a way for a fresh start to occur at each instance so that the different instances are not "infected" by problems associated with other remote VBTs.

Figure 2:
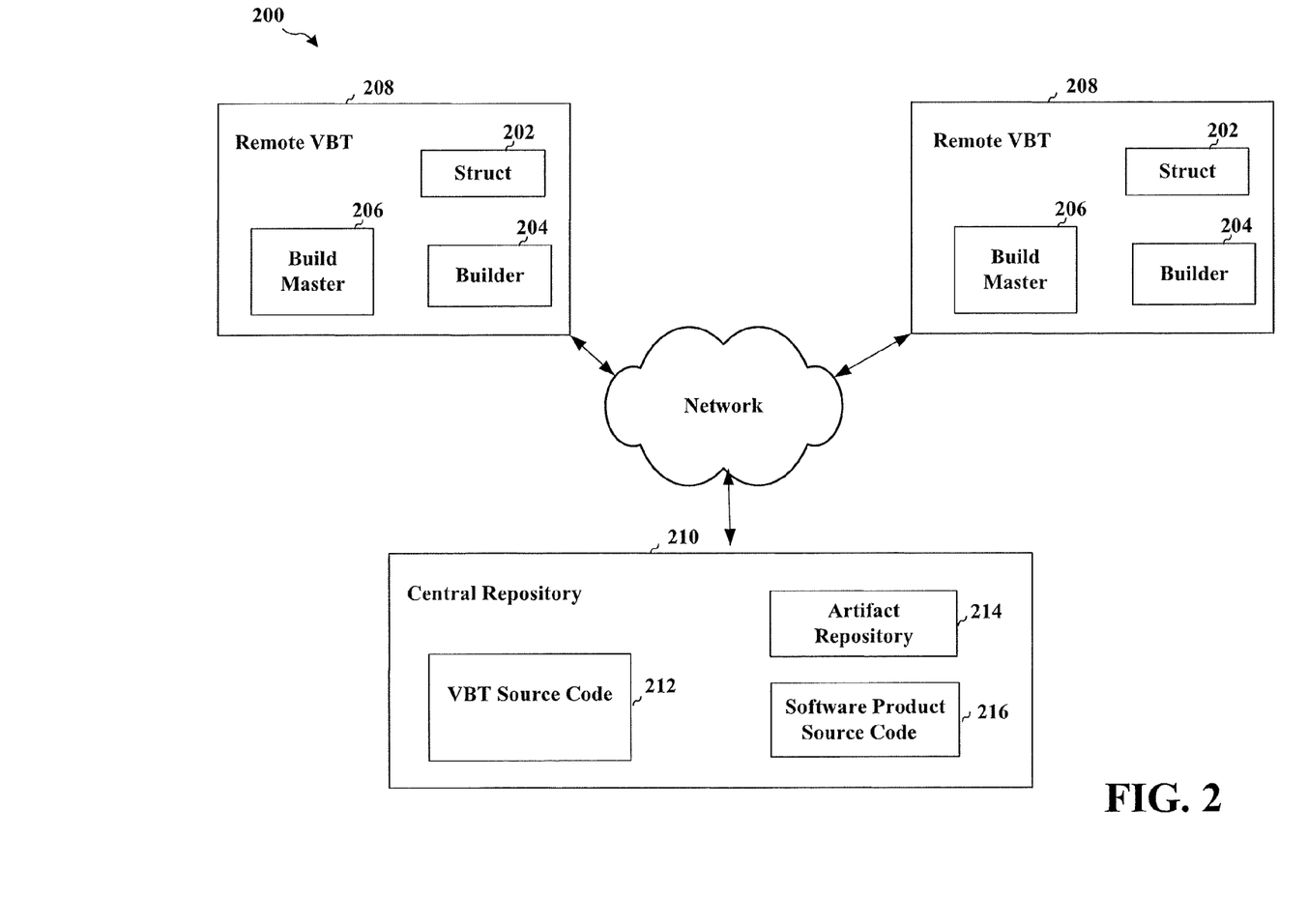
FIG. 2 is a diagram illustrating aspects of an example versioned build and test system.

FIG. 2 illustrates a diagram of example aspects of a VBT system 200. FIG. 2 illustrates two separate instances 208 of a VBT, similar to the instance 100 illustrated in FIG. 1. Each instance comprises a remote, virtual build system. Each instance 208 includes a virtual support machine 202, a virtual build machine 204, and a virtual build master machine 206 encapsulated within a virtual host machine 208. Each of the multiple remote VBT instances 208 of the virtual build system 200 are configured to enable build jobs to be checked out directly such that the build job is begun within the remote VBT 208.

FIG. 2 also illustrates a central repository 210 for the software automation build system including a source code repository for a build system 212. This source code repository 212 is also referred to herein as the VBT source code repository. The VBT source code repository 212 comprises at least one configuration file specifying a build and test environment. The configuration file can be accessed remotely by users to replicate a consistent virtual build and test environment for developing and testing code of the software product at different locations using virtual machines. Thus, users may access the VBT source code 212, e.g., via a network, in order to instantiate the remote VBT instances 208. The central repository 210 may comprise multiple versions of the configuration file so that any of multiple previous versions may be accessed and built virtually.

When source code for a VBT is developed or modified, the source code can be saved, e.g., in repository 212, and a version can be assigned so that a VBT instance can be reconstructed in an automated manner according to multiple versions. Each version of the configuration files comprises a complete replica of a primary instance build and test environment including source code and build servers. Multiple instances can be generated and operated independently at different locations. Once instantiated, each of the multiple instances is capable of operating without an ongoing connection to the VBT source code repository 212.

The central repository may further include a source code repository 216 storing source code of the software product. The source code repository 216 may receive finished build jobs from the remote instances 208. Finished build jobs may be checked in and stored in the central software product source code repository 216 so that they are accessible by each of the multiple instances 208.

The central repository 210 may also include an artifact repository 214 that stores build output and meta-data for each build.

In some embodiments, there may be, e.g., no difference between a production build environment, a development environment, or a staging environment. This can be important so that a developer has a way to reproduce and use the exact same environment that will be used to build production artifacts. By having the same production build environment available for a developer, potential issues that may not show up until production build time, can be discovered earlier in the development cycle. However, in the real world, it may not be desirable to archive build artifacts that were created during the development. Thus a distinction may be made between VBT instances for different types. This may allow, among other differences between types of environments, different archiving of the resulting artifacts. An instance may be designated as a production environment or a development environment. Both environments may have similar structure and function with respect to the virtual support system 102, the virtual build machine, and the encapsulating host system 108. However, the build master machine may operate differently depending on whether the instance is designated as a production environment or a development environment. For example, build jobs may be stored locally for the development environment whereas build jobs for the production environment may be pushed to a production repository, e.g., at the central repository 210.

Additionally, the development environment might be configured to avoid sending build report documents, transmit information to clients, cause a version to be assigned, etc. such as might occur in a production environment.

An instance may switch between functioning as a development environment and a production environment. The system may cause an instance to default to a type of environment if an indication of the type is not received. For example, when an instance is initiated, the system may default to instantiating a development environment, unless a production environment is specified.

In some embodiments, the VBT system allows development teams working in parallel to obtain consistent build/testing results.

In some embodiments, branching may be used in order to isolate the changes needed by one build target from all other build targets, thereby eliminating side-effects that would be unknowingly applied to other build targets.

The VBT system can enable individual developers to develop changes to the build system without impacting other developers, and then share those changes as needed to other users without forcing all users to adopt the changes.

Some embodiments of the VBT system may provide a versioned peer-to-peer software build and test system comprising a plurality of independent VBT instances, wherein the instances can communicate with each other and can elect a primary VBT system to coordinate certain functions across instances, such as assigning version numbers, wherein changes may be selectively propagated from one instance to another, and wherein all steps necessary to make a build in any instance can be stored (archived) in a state prior to manufacturing. For example, the primary VBT system may be responsible for assigning version numbers.

Figure 3A:
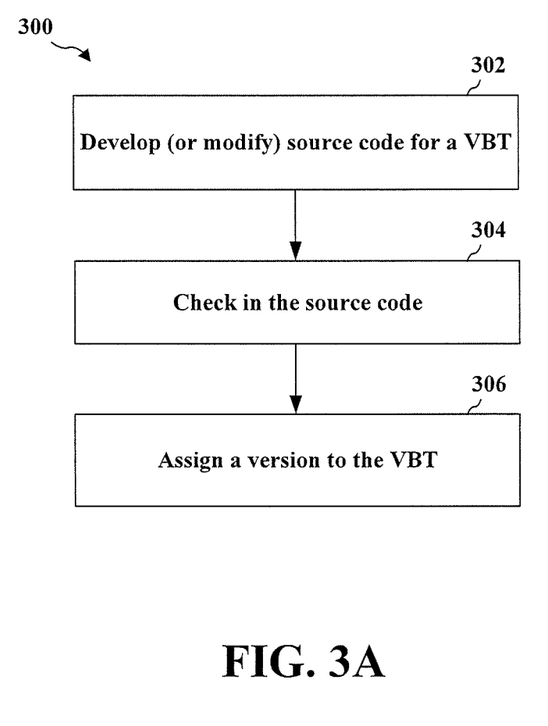
FIGS. 3A and 3B are flow diagrams illustrating aspects of a versioned build method.
Figure 3B:
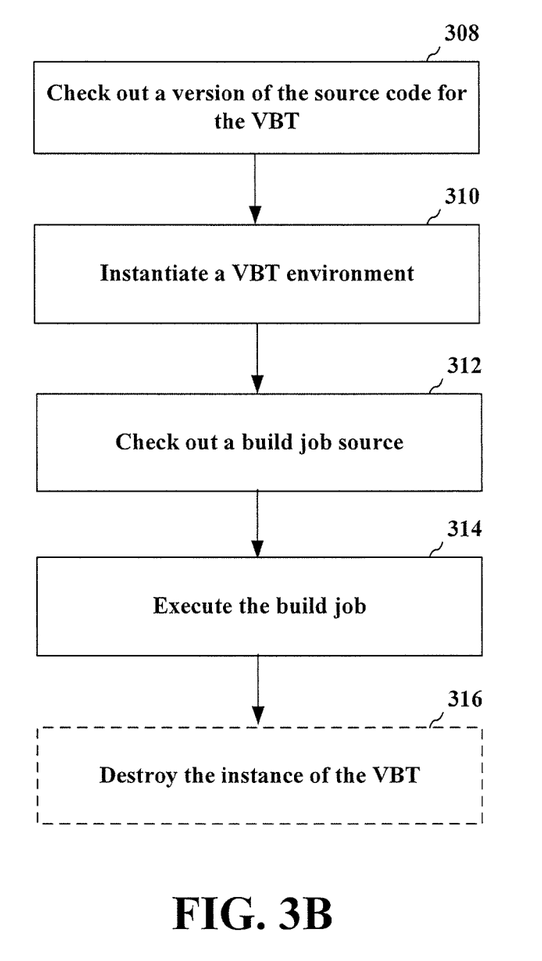

FIGS. 3A and 3B illustrate flow charts of a build method. Initially, source code is developed or modified for a VBT for developing and testing code of a software product using virtual machines. At 302, this developed or modified source code is received.

At 304, the source code is stored in a configuration file, e.g., 212, that can be accessed to instantiate a VBT. Thus, the source code may include code for instantiating a VBT system that includes a virtual build master machine 106, a virtual build machine 104, a virtual support machine 106, and an encapsulating host machine 108, as described in connection with FIGS. 1 and 2. The source code comprises, e.g., a complete replica of a primary instance of the build system including source code and build servers.

In one embodiment, the version may be kept in an exe file. The file may be checked out, checked in, and updated as needed by various users. At 306, a version is assigned to the stored source code for the VBT. Thus, a different version can be assigned for modifications to the VBT source code. By assigning a version to modified source code for the VBT, a VBT system can be reconstructed in an automated manner according to any of multiple versions. The version may be automatically assigned by the VBT system.

FIG. 3A illustrates aspects of the creating the VBT configuration file. Once the source code is developed, it can be accessed in order to instantiate a VBT, as illustrated in FIG. 3B.

Thus, at 308 a version of the source code for the VBT is checked out. At 310, a VBT instance is instantiated. Multiple instances may be instantiated independently from each other. Each of the instances are capable of operating without an ongoing connection to the configuration file in the central repository.

At 312, a build job is checked out at the instance. The build job is executed at 314. Once the build job is executed, which may include checking in the executed build job to a central repository, the instance may optionally be destroyed at 316. A new instance, whether of the same version of the VBT source code or of a different version, may later be instantiated using a VBT configuration file in order to execute additional build jobs. As the configuration file at the central repository stores the source code for instantiating a VBT, including its virtual machines, any VBT version instances can be reconstructed automatically when desired. By destroying a previous instance and beginning afresh, it is clear to users when a build job has been executed and finished. Additionally, unintended artifacts will not remain in the instance that might cause problems with later build jobs.

The system saves versions of the VBT configuration so that previous versions of the VBT can be accessed and built virtually. Thus, not only can the entire system be built or rebuilt at any time, but also, multiple previous versions of the entire system can be automatically rebuilt as a virtual machine.

This can be helpful in environments where outside access is not permissible, such as for secure projects that cannot allow access outside of a particular building location. By encapsulating a safe copy of the build and test environment, other remote users may work on projects without requiring continued access to the environment maintained within the building.

Aspects can also be helpful in a virus protection environment, where separation and remote operation of individual instances may be desirable.

Aspects may further include a machine readable medium comprising code for performing the method described in connection with FIGS. 3A and 3B.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Figure 4:
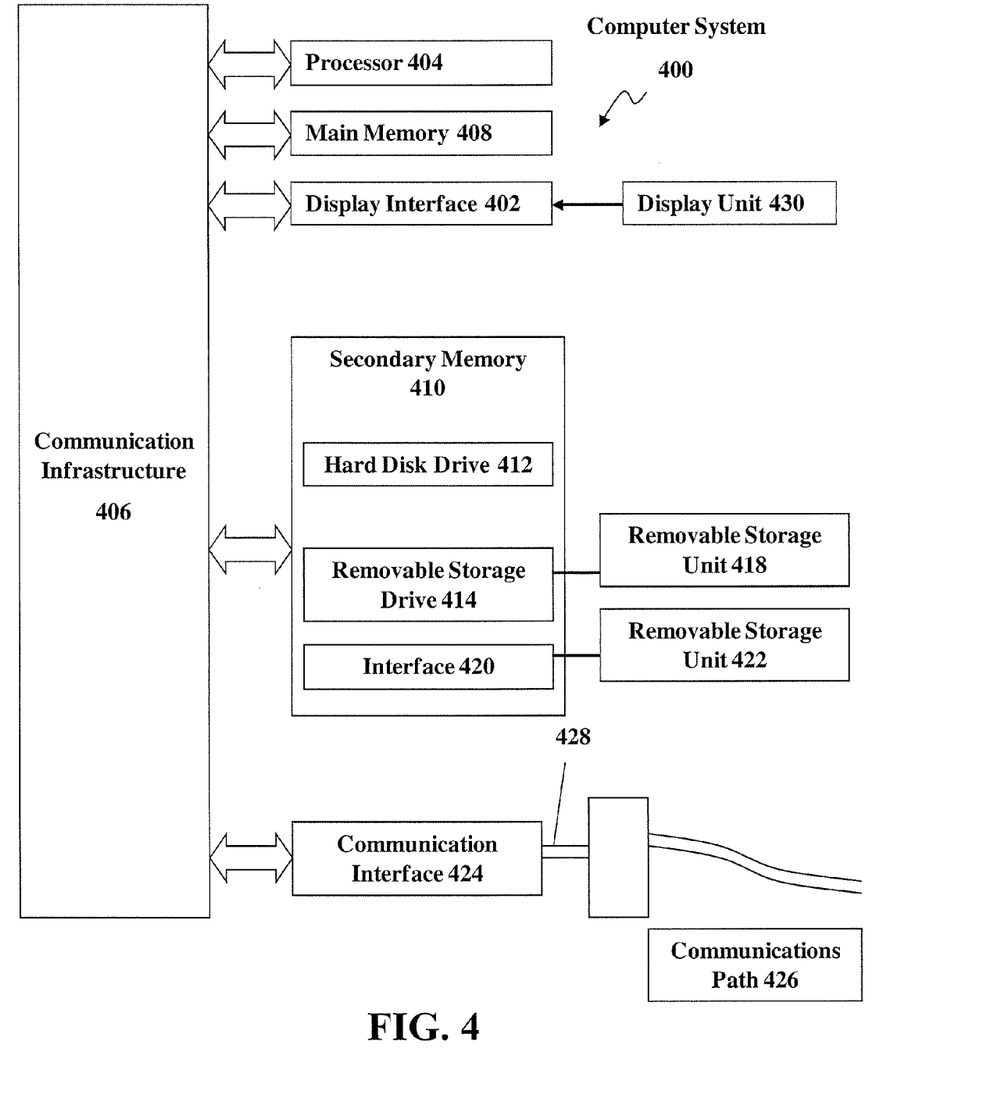
FIG. 4 is an example system diagram of various hardware components and other features for use in accordance with aspects presented herein.

FIG. 4 presents an example system diagram of various hardware components and other features, for use in accordance with aspects presented herein. Certain aspects may be implemented using software, hardware, or a combination thereof and may be implemented using one or more computer systems or other processing systems. One implementation may include one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). Various software implementations are described in terms of this example computer system. After reading this description, it will become apparent to a person skilled in the relevant art(s) that other computer systems and/or architectures can be used to implement the VBT.

Computer system 400 can include a display interface 402 that forwards graphics, text, and other data from the communication infrastructure 406 (or from a frame buffer not shown) for display on a display unit 430. Computer system 400 also includes a main memory 408, preferably RAM, and may also include a secondary memory 410. The secondary memory 410 may include, for example, a hard disk drive 412 (or hybrid and/or solid state drives) and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative implementations, secondary memory 410 may include other similar devices for allowing computer programs or other instructions to be loaded into computer system 400. Such devices may include, for example, a removable storage unit 42422 and an interface 420. Examples of such may include a program cartridge and cartridge interface (such as that found in video game devices), a removable memory chip (such as an EPROM, or programmable read only memory (PROM)) and associated socket, and other removable storage units 42422 and interfaces 420, which allow software and data to be transferred from the removable storage unit 42422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 414, a hard disk installed in hard disk drive 412, and signals 428. These computer program products provide software to the computer system 400. Some embodiments presented herein may include such computer program products.

Computer programs (also referred to as computer control logic) are stored in main memory 408 and/or secondary memory 410. Computer programs may also be received via communications interface 424. Such computer programs, when executed, enable the computer system 400 to perform the features presented herein. In particular, the computer programs, when executed, enable the processor 410 to perform the features presented herein. Accordingly, such computer programs represent controllers of the computer system 400.

In an implementation using software, the software may be stored in a computer program product and loaded into computer system 400 using removable storage drive 414, hard drive 412, or communications interface 420. The control logic (software), when executed by the processor 404, causes the processor 404 to perform the functions described herein. Another implementation may primarily be implemented in hardware using, for example, hardware components, such as application specific integrated circuits (ASICs). Implementation of the hardware state machine so as to perform the functions described herein will be apparent to persons skilled in the relevant art(s).

In yet another implementation, certain aspects may be implemented using a combination of both hardware and software.

Figure 5:
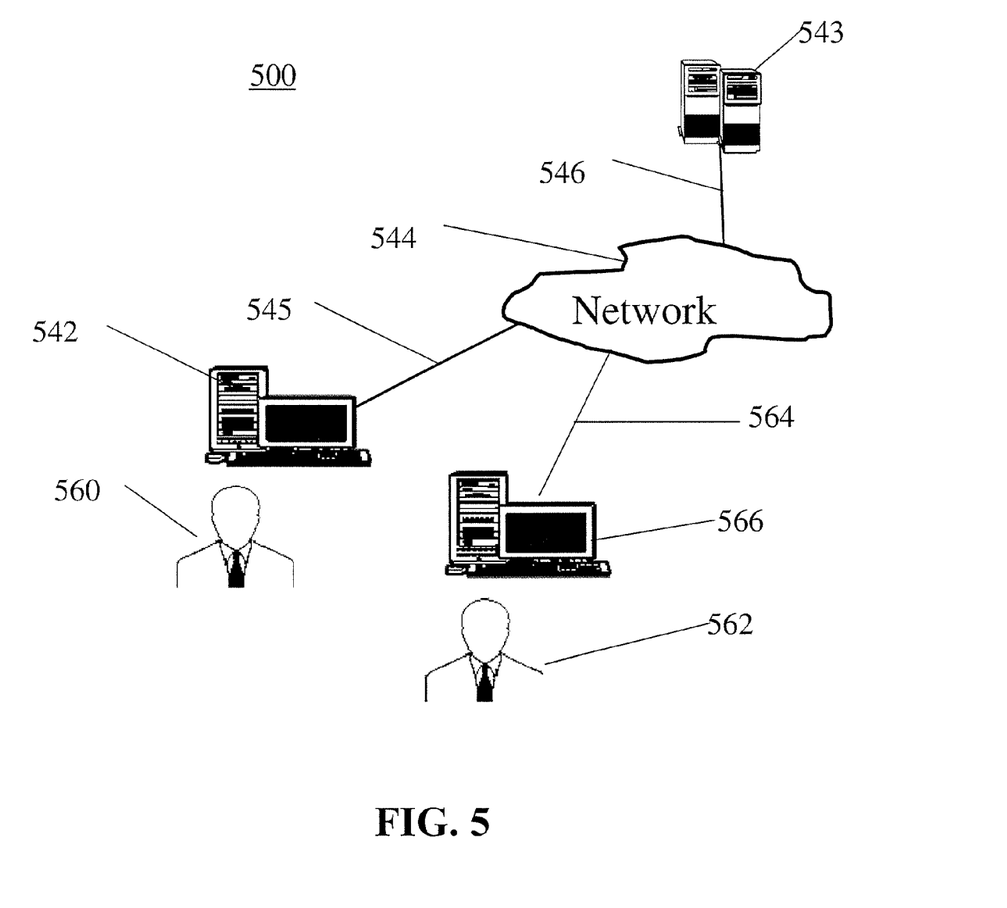
FIG. 5 is a diagram of various example system components, in accordance with aspects presented herein.

FIG. 5 is a block diagram of various example system components, in accordance with some embodiments presented herein. FIG. 5 shows a communication system 500 usable in accordance with the embodiments presented herein. The communication system 500 includes one or more accessors 560, 562 (also referred to interchangeably herein as one or more "users" or clients) and one or more terminals 542, 566. In an implementation, data for use in accordance with some embodiments may be, for example, input and/or accessed by accessors 560, 564 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, for example, a network 544, such as the Internet or an intranet, and couplings 545, 546, 564. The couplings 545, 546, 564 include, for example, wired, wireless, or fiber optic links.

The various exemplary embodiments are provided to enable one of ordinary skill in the art to practice various aspects of the present invention. Modifications to exemplary embodiments presented throughout this disclosure will be readily apparent to those skilled in the art, and the concepts disclosed herein may be extended to other devices. All structural and functional equivalents to the various components of the exemplary embodiments described throughout this disclosure that are known or later come to be known to those of ordinary skill in the art are expressly incorporated herein by reference.

What is claimed is:

1. A software automation build system comprising:
one or more non-transitory source code repositories, the one or more source code repositories comprising:
source code of a software product; and
a configuration specifying a build and test environment, the configuration stored in a configuration file accessible by remote users to replicate a consistent virtual build and test environment at a remote system for developing and testing code of the software product at different locations using virtual machines, the configuration file comprising,
a configuration for reconstructing a virtual build machine configured to perform tasks to build the code of the software product including executing a build job using the reconstructed virtual build machine so that multiple versions of the build and test environment can be accessed and built virtually.

2. The software automation build system of claim 1, wherein the source code repository for the build system comprises:
multiple instances of the build and test environment based on the configuration.

3. The software automation build system of claim 1, wherein the system assigns a version to the configuration specifying the build and test environment such that the system saves multiple versions of the configuration.

4. The software automation build system of claim 1, wherein the configuration file further comprises a configuration for instantiating:
a virtual build master machine configured to manage tasks within a software build project to build the code of the software product;
an encapsulating virtual machine that encapsulates the virtual build machine and the virtual build master machine and is configured to enable communication between the virtual build machine and the virtual build master machine; and
an additional virtual machine encapsulated within the encapsulating virtual machine, which is configured to provide support functions to the virtual build master machine and the virtual build machine.

5. The software automation build system of claim 1, wherein the system automatically saves and assigns a version to configurations of the build and test environment so that a virtual machine instance can be reconstructed in an automated manner according to multiple versions.

6. The software automation build system of claim 1, wherein the configuration comprises a complete replica of a primary instance build and test environment including source code and build servers so that multiple instances can be generated and operated independently at different locations.

7. The software automation build system of claim 6, wherein each of the multiple instances are capable of operating without an ongoing connection to the source code repository for the build system.

8. The software automation build system of claim 6, wherein each of the multiple instances comprises a remote virtual build system, and
wherein each of the multiple remote instances of the virtual build system are configured to enable build jobs to be checked out such that the build job is begun within the remote virtual build system.

9. The software automation build system of claim 6, wherein the source repository is configured to receive a finished build job from one of the instances and to check the finished build job in to a primary source repository that is accessible by each of the multiple instances.

10. The software automation build system of claim 6, wherein the multiple instances are capable of selecting a primary system to coordinate functions among the instances, including at least one selected from a group consisting of propagating changes from one instance to another and assigning version numbers.

11. The software automation build system of claim 1, wherein the system can designate an instance as a production environment or a development environment.

12. The software automation build system of claim 11, wherein the instance can be switched between a production environment and a development environment.

13. The software automation build system of claim 12, build jobs are stored locally for the development environment and build jobs are pushed to a production repository for the production environment.

14. The software automation build system of claim 11, wherein when an instance is initiated, the system defaults to the development environment, unless the production environment is specified.

15. A build method comprising:
developing source code for a versioned build system for developing and testing code of a software product using virtual machines;
storing the source code in a configuration file accessible to instantiate a virtual build system via a remote processor, wherein the source code comprises code for instantiating a versioned build system that includes reconstructing a virtual build machine configured to perform tasks to build the code of the software product,
wherein building the code of the software product includes executing a build job at the instantiated build system; and
assigning a version to the source code for the virtual build system so that multiple versions of the build system can be accessed and built virtually.

16. The method of claim 15, wherein the source code comprises code for instantiating the versioned build system that further includes:
a virtual build master machine configured to manage tasks within a software build project to build the code of the software product;
an encapsulating virtual machine that encapsulates the virtual build machine and the virtual build master machine and is configured to enable communication between the virtual build machine and the virtual build master machine; and
an additional virtual machine encapsulated within the encapsulating virtual machine, which is configured to provide support functions to the virtual build master machine and the virtual build machine.

17. The method of claim 15, further comprising:
automatically saving and assigning a version to modifications of the source code for the build system so that a virtual build system can be reconstructed in an automated manner according to any of multiple versions.

18. The method of claim 15, wherein the source code comprises a complete replica of a primary instance of the build system including source code and build servers.

19. The method of claim 18, wherein each of the instances are capable of operating without an ongoing connection to the configuration file.

20. The method of claim 15, further comprising:
   checking out a version of the source code for the build system; and
   instantiating an instance of the build system.

21. The method of claim 20, further comprising:
   checking out a build job at instance; and
   executing a build job at the instance.

22. The method of claim 21, further comprising:
   destroying the instance after the build job is executed.

23. A non-transitory machine readable medium, comprising code for:
   receiving source code for instantiating a build system for developing and testing code of a software product using virtual machines, the source code comprising code for instantiating a build system that includes reconstructing a virtual build machine configured to perform tasks to build the code of the software product;
   storing the source code in a configuration file accessible to instantiate a virtual build system at a remote processor in order to execute a build job at the instantiated virtual build system; and
   assigning a version to the source code for the virtual build system so that multiple versions of the build system can be accessed and built virtually.

24. The machine readable medium of claim 23, further comprising code for instantiating the build system that includes:
   a virtual build master machine configured to manage tasks within a software build project to build the code of the software product;
   an encapsulating virtual machine that encapsulates the virtual build machine and the virtual build master machine and is configured to enable communication between the virtual build machine and the virtual build master machine; and
   an additional virtual machine encapsulated within the encapsulating virtual machine, which is configured to provide support functions to the virtual build master machine and the virtual build machine.

25. The machine readable medium of claim 24, further comprising code for:
   checking out a version of the source code for the build system;
   instantiating an instance of the build system;
   checking out a build job at instance; and
   executing a build job at the instance.

* * * * *